J. C. GEBHART.
APPARATUS FOR MEASURING TEXTILE FABRIC AND COMPUTING THE PRICE THEREOF.
APPLICATION FILED MAR. 17, 1916.
1,250,845.
Patented Dec. 18, 1917
2 SHEETS—SHEET 1.
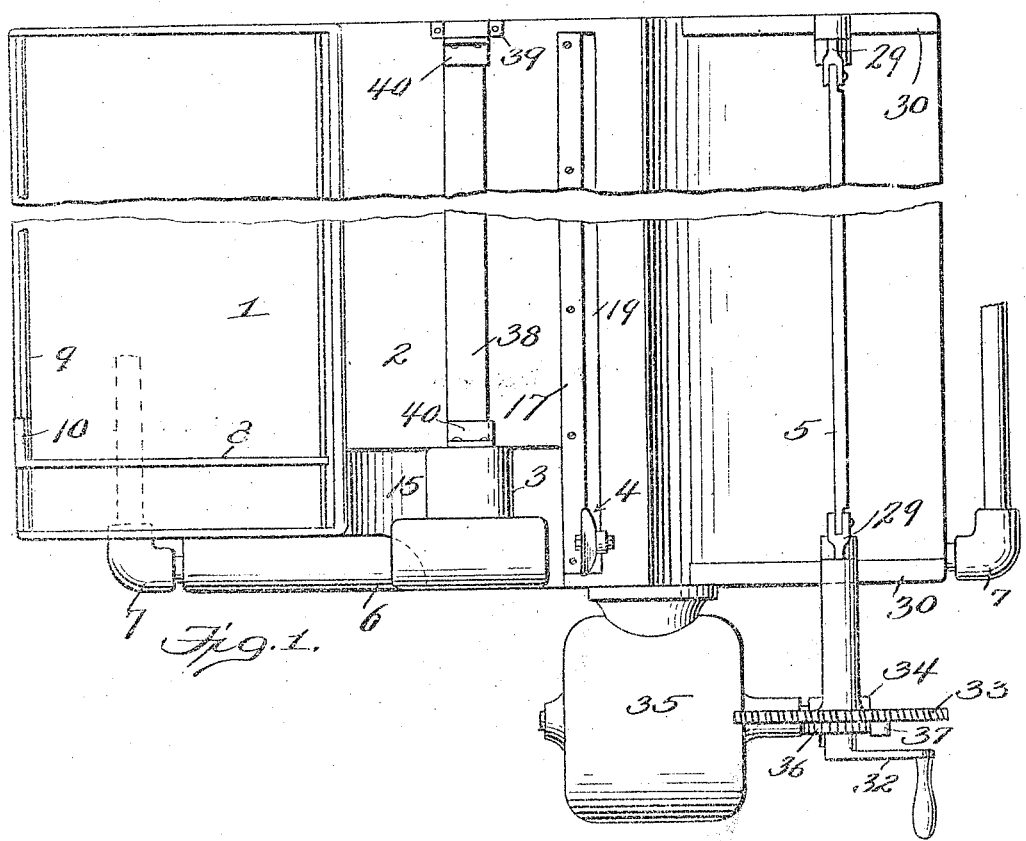
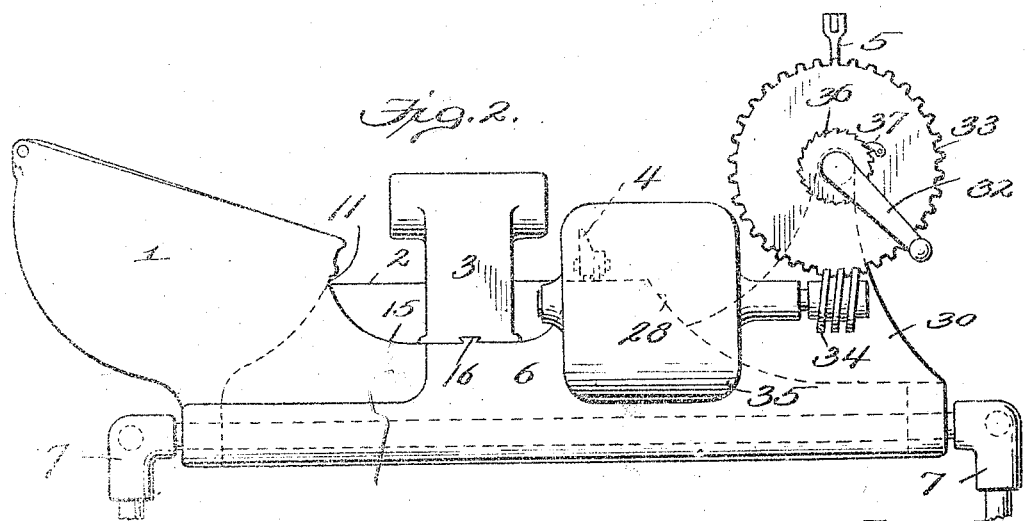
Inventor
John C. Gebhart

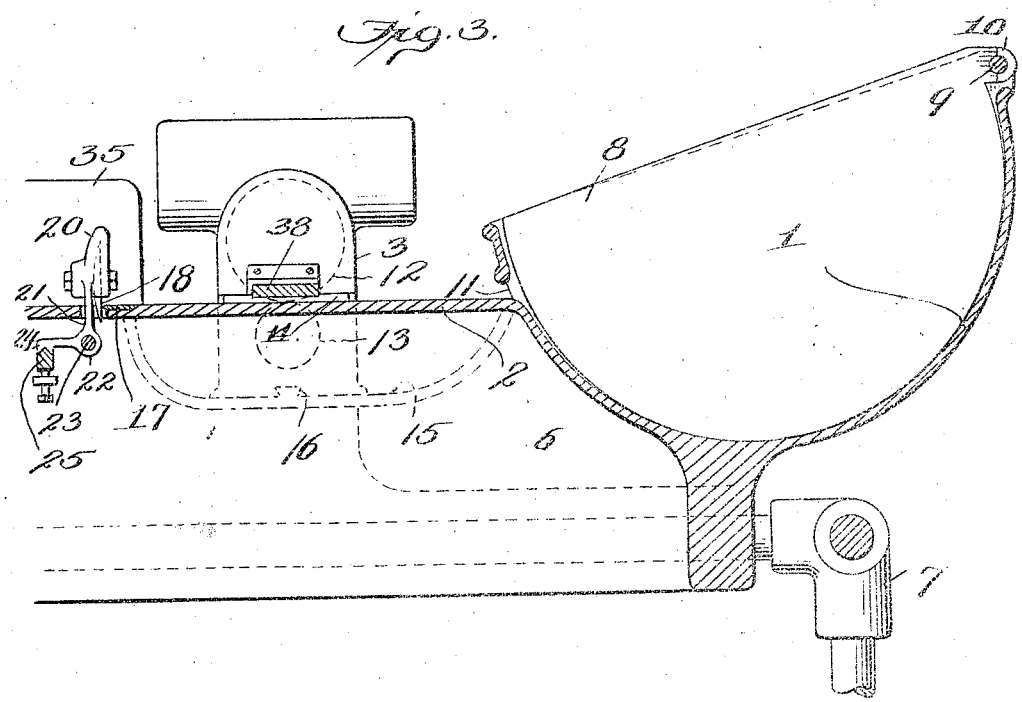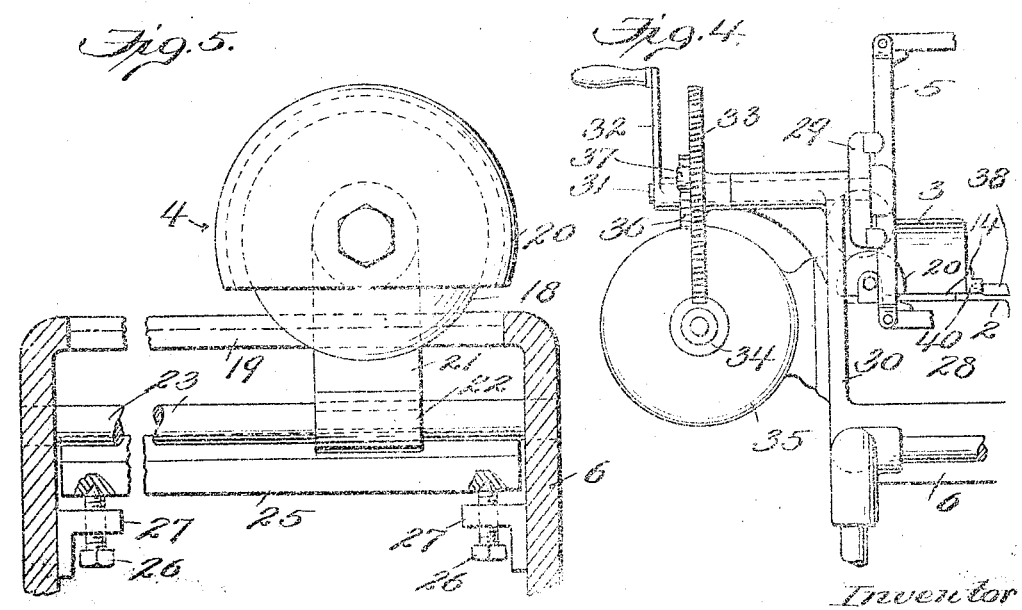

UNITED STATES PATENT OFFICE.

JOHN C. GEBHART, OF ST. LOUIS, MISSOURI, ASSIGNOR, BY MESNE ASSIGNMENTS, TO ECONOMETER COMPANY, OF ST. LOUIS, MISSOURI, A CORPORATION OF MISSOURI.

APPARATUS FOR MEASURING TEXTILE FABRIC AND COMPUTING THE PRICE THEREOF.

1,250,845. Specification of Letters Patent. Patented Dec. 18, 1917.

Application filed March 17, 1916. Serial No. 84,901.

*To all whom it may concern:*

Be it known that I, JOHN C. GEBHART, a citizen of the United States, residing at St. Louis, in the State of Missouri, have invented new and useful Improvements in Apparatus for Measuring Textile Fabric and Computing the Price Thereof, of which the following is a specification.

This invention relates to an apparatus for measuring and computing the price of textile fabric, proposing an apparatus which is especially designed for use in connection with wholesale merchandising but which may be advantageously used, for measuring alone, in connection with taking an inventory of stock.

The principal objects of the invention are to promote quickness, accuracy and facility in connection with the selling of fabric in whole-sale lengths and to provide an apparatus for this purpose which takes up a minimum degree of space on the counter, and in which the length measuring and price computing machine is a separable element capable of independent use.

The invention consists in certain features of structure, combination, and relation which, together with the above and other objects and advantages, will appear as the description proceeds.

An embodiment of the invention is illustrated in the accompanying drawings, wherein:—

Figure 1 is a plan view of an apparatus in which the features of the invention are incorporated;

Fig. 2 is a side elevation thereof;

Fig. 3 is a partial vertical longitudinal sectional view thereof;

Fig. 4 is a partial end elevation; and

Fig. 5 is a detail cross-sectional view showing the construction and mounting of the rotary cutter by which the measured length is severed.

Similar characters of reference designate corresponding parts throughout the several views.

The principal elements of the apparatus, generally considered, are a trough 1 in which is placed the bolt from which a measured length of fabric is to be unwound and which centers said bolt during the unwinding of the fabric, a flat table 2 adjoining the trough 1 at one side thereof, a length measuring and price computing machine 3 which adjoins one end of the table 2, a cutting device 4 by which a measured length of material may be completely severed, and a reel 5 by which the fabric is unwound from the bolt and drawn through the measuring machine 3 and upon which the measured length of fabric is re-wound.

The measuring and price computing machine 3 may be of any suitable construction capable of separate use. The drawings show diagrammatically a machine of the construction disclosed in my co-pending application Serial No. 84,889.

The reel 5 is removable from the apparatus and may be of any suitable construction but a collapsible reel of the construction disclosed in my co-pending application Serial No. 84,902 is preferred and such a reel is shown in a general way in the drawings.

The trough 1 and the table 2 are preferably formed integral with or as component parts of a base 6 from which all the elements of the apparatus are supported, and which, in turn, is mounted upon a suitable supporting frame 7.

The trough 1 is provided with a partition 8 by which the effective length of the trough may be adapted to the length of the bolt of fabric. The end walls of the trough support a rod 9 which extends longitudinally of the trough and the partition 8 has an opening conforming to the rod 9 and through which said rod projects. At the rear side of the rod 9 the partition 8 is provided with an extension 10 parallel to and conformably fitting over said rod, this extension having a semi-circular cross section. The effective length of the trough 1 is reduced by sliding the partition 8 toward that end of the trough which adjoins the machine 3. The partition 8 is obviously selflocking against movement toward the other end of the trough in consequence of pressure applied to its body. In order to move the partition 8 toward that end of the trough which is distant from the machine 3 to thereby increase the effective length of the trough pressure is applied against that end of the extension 10 which adjoins said partition whereupon the partition will slide freely on the rod 9 to the position desired. While the fabric to be measured could be drawn over the upper front edge of the trough, it is preferred to provide the front wall of the trough with a longitudinal outlet slot 11 through which the fabric passes, the lower edge of said slot being in the plane of the table 2.

The length measuring and price computing machine 3 will preferably be of a construction wherein the marginal portion of the strip of fabric passes between upper and lower rollers 12 and 13 and through a slot 14 (Fig. 3) in the front and side walls of the casing of the machine and wherein one of said rollers, preferably the upper roller, is a power roller and, by its rotation, effects the operation of the machine. The table 2 is, therefore, co-planar with the pass of the rollers 12 and 13; and the trough 1 has a length equal to the sum of the width of the table 2 and the length of the slot 14 in the side walls of the casing of the machine 3. The base 6 has at one end of the table and inward of the adjacent end of the trough a depression or recess 15 to accommodate the lower portion of the machine and to enable said machine to be positioned in immediate juxtaposition to the adjacent end of the table 2 with the pass of its rollers 12 and 13 in the same plane as said table, the said recess by virtue of its described location being overhung by the marginal portion of the fabric as the latter is drawn across the table 2.

The machine 3 is capable of separate or independent use and is, therefore, a separable part of the apparatus. To enable the ready association and dissociation of the machine 3 relatively to the base 6 the front and rear walls of the casing of the machine 3 are provided in their lower edges with dovetail recesses and the bottom or base of the depression or recess 15 is provided with a dovetail rib 16 extending transversely of the base 6 for engagement in said dovetail recesses. The machine 3 may obviously be removed from the apparatus by sliding it laterally outward until its dovetail recesses have disengaged the rib 16.

The depression or recess 15 is adjoined at one end by the trough 1 and at its other end by that portion of the table 2 with which the cutting device is associated and the pass of the rollers 12 and 13 is therefore in the path of the marginal portion of the strip of fabric which is acted upon throughout its width by the said cutting device.

The cutting device consists of a fixed transverse blade 17 flush with the table 2 and a rotary blade 18. The blade 17 adjoins a transverse slot 19 in which the lower or cutting portion of the blade 18 operates. The axis of the blade 18 has its bearings in a casing 20 which completely covers the upper portion of the blade, serving the duel function of a guard to project the blade against damage and the operator against injury therefrom and of a handle to enable movement of the blade lengthwise of the slot 19. The casing 20 is formed as a part of an L-shaped bracket 21 (Fig. 3) having at the junction of its vertical and horizontal arms a collar 22 which is slidably and pivotally mounted on a transverse rod 23 supported under the table 2 by the side walls of the base 6. The horizontal arm of the bracket 21 terminates in a shoe 24, which slidably engages a transverse bar 25 supported for vertical adjustment and arranged under the table 2 slightly in advance of the rod 23. The position of the blade 18 with reference to the rod 23 as a pivotal axis is determined by the elevation at which the bar 25 is supported. Obviously, by raising or lowering the bar 25 the pressure with which the blade 18 bears against the blade 17 or the spacing of the blades 18 and 17 can be increased or decreased as desired to compensate for wear or to adapt the cutting device to particular kinds of fabric. To provide for vertical adjustments of the bar 25 its ends are supported upon adjusting screws 26 (Fig. 5) threaded through brackets 27 secured to the side walls of the base 6.

The use of the cutting device assumes that the measurement of the fabric is started with the transverse edge of the fabric in coincidence with the cutting edge of the blade 17. When the length of fabric desired has been unwound from the bolt, as shown by the length indicating scale of the machine 3, the operation of the reel 5 is arrested and the measured length is severed from the rest of the fabric by moving the blade 18 lengthwise of the slot 19, the casing 20 being used as a handle and the bracket 21 sliding freely along the rod 23 and the bar 25. When the cutting operation is completed, the blade 18 is returned to its normal position adjacent the machine 3, in which position it is located at one side of the selvage edge of the fabric and wholly out of the path of the moving strip.

The table 2 is continued for a short distance, suitably beyond the slot 19, and beyond said table the base 6 is formed with a transverse depression 28 (Fig. 2) to accommodate the reel 5. The reel bearers 29 are mounted in upright standards 30 located at the sides of the base and which are formed with bearings for the shafts of said bearers. One of said shafts, as 31, is a power shaft and may be operated manually or by a motor. The shaft 31 accordingly is provided with a crank 32 by which it may be operated manually and with a worm wheel 33 driven by a worm 34 on the shaft of a motor 35 suitably supported at the side of the base 6. The crank 32 has fast on its hub a ratchet wheel 36 and the worm wheel 33 which is loose on the shaft 31 is provided with a pawl 37 for coöperation with the ratchet wheel 36, the rotation of the worm wheel being of course transmitted to the shaft 31 through the pawl 37 and ratchet wheel 36. It will be apparent that the shaft 31 may be rotated by the crank 32 independently of the motor 35.

The fabric will, of course, be unwound from the bolt in the trough 1, continuously with the rotation of the reel. To insure of the evenness of the fabric as it passes through the measuring machine a bar 38 (Fig. 1) is supported at a suitable elevation above the table 2 in front of the machine 3 and the fabric passes under this bar and is thereby kept smooth and held in a uniform plane as it is drawn through the measuring machine. The casing of the machine 3 may be utilized for the support of one end of the bar 38 and an upright bracket 39 secured to the base 6 will support the other end of the bar, the said casing and bracket being provided with rearwardly directed U-shaped clips 40 in which the ends of the bar 38 are removably fitted.

I claim:

1. A unitary apparatus of the class described having in combination, a trough to hold a bolt of fabric and to center said bolt as the fabric is unwound, a flat table immediately adjoining the trough at one side thereof and over which the fabric is drawn as it is unwound from the trough, and a supporting base common to the table and the trough, the base having a recess at one end of the table located inward of the adjacent end of the trough, said recess being thereby under the fabric as it is drawn from the trough across the table and being formed for the removable mounting and support therein of a length measuring machine for coöperation with that portion of the fabric which overhangs the recess.

2. In an apparatus of the class described, in combination, a table having a slot, a fixed blade adjoining one edge of the slot, a bracket slidable lengthwise of the slot, a rotary blade, and a guard formed with said bracket and disposed above said table, said guard inclosing the upper portion of the rotary blade, the latter having its axis journaled in opposite walls of said guard.

3. In an apparatus of the class described, in combination, a table having a slot, a fixed blade adjoining one edge of the slot, a movable blade co-acting with the fixed blade, a rod arranged under the table, a bar arranged under the table parallel to the rod, an L-shaped bracket carrying the movable blade and having at the junction of its arms a collar slidably and pivotally mounted on said rod, said bracket having its horizontal arm formed with a shoe to engage said bar, and means for adjusting the elevation of said bar.

4. In an apparatus of the class described, in combination, a table having a slot, a fixed blade adjoining one edge of the slot, a rotary blade co-acting with the fixed blade, a rod arranged under the table, a bar arranged under the table parallel to the rod, an L-shaped bracket carrying the rotary blade and having formed therewith a combined guard and handle inclosing the upper portion of the rotary blade, said bracket having at the junction of its arms a collar slidably and pivotally mounted on said rod and having its horizontal arm formed with a shoe to engage said bar and means for adjusting the elevation of said bar.

5. In an apparatus of the class described, in combination, a table having a slot, a fixed blade adjoining one edge of the slot, a movable blade co-acting with the fixed blade and mounted above the table, a bracket carrying the movable blade, and a transverse guide rod supported by and arranged under the table and upon which said bracket is slidably mounted, said bracket projecting through the slot.

6. In an apparatus of the class described, in combination, a table having a slot, a fixed blade adjoining one edge of the slot, a rotary blade co-acting with the fixed blade, a slidably and pivotally mounted bracket carrying the rotary blade and means for adjusting said bracket about its pivotal axis to position the rotary blade nearer to or farther from the fixed blade.

7. In an apparatus of the class described, in combination, a table having a slot, a fixed blade adjoining one edge of the slot, a movable blade operating in the slot, a rod arranged under and carried by the table parallel to the slot and a bracket slidably mounted on said bar and carrying the movable blade.

8. In an apparatus of the class described, in combination, a table having a slot, a fixed blade adjoining one edge of the slot, a movable blade co-acting with the fixed blade, a guard inclosing the upper portion of the movable blade, a bracket carrying the guard and a transverse guide rod supported by and arranged under the table and upon which said bracket is slidably mounted, said bracket projecting through the slot.

9. In an apparatus of the class described, in combination, a reel, an operating shaft at one end thereof, an operating crank for said shaft, a ratchet wheel fast with the hub of said crank, a gear wheel loose on said shaft and adapted to be driven by a motor and a pawl carried by said gear wheel for engagement with said ratchet wheel.

10. In an apparatus of the class described, in combination, a base having a trough at one end thereof, and a flat table adjoining the trough, a measuring machine adjacent one end of the table having a power roller over which the marginal portion of the fabric passes as the fabric is drawn across the table, a reel at the end of the base distant from the trough and a bar supported above the table adjacent the machine to hold the fabric even and in a uniform plane.

In testimony whereof I have hereunto set my hand in presence of two subscribing witnesses.

JOHN C. GEBHART.

Witnesses:
  CHAS. S. HYER,
  JOHN S. POWERS.